No. 888,610. PATENTED MAY 26, 1908.
H. L. HARTENSTEIN.
APPARATUS FOR MANUFACTURING CARBID.
APPLICATION FILED NOV. 30, 1906.
2 SHEETS—SHEET 2.
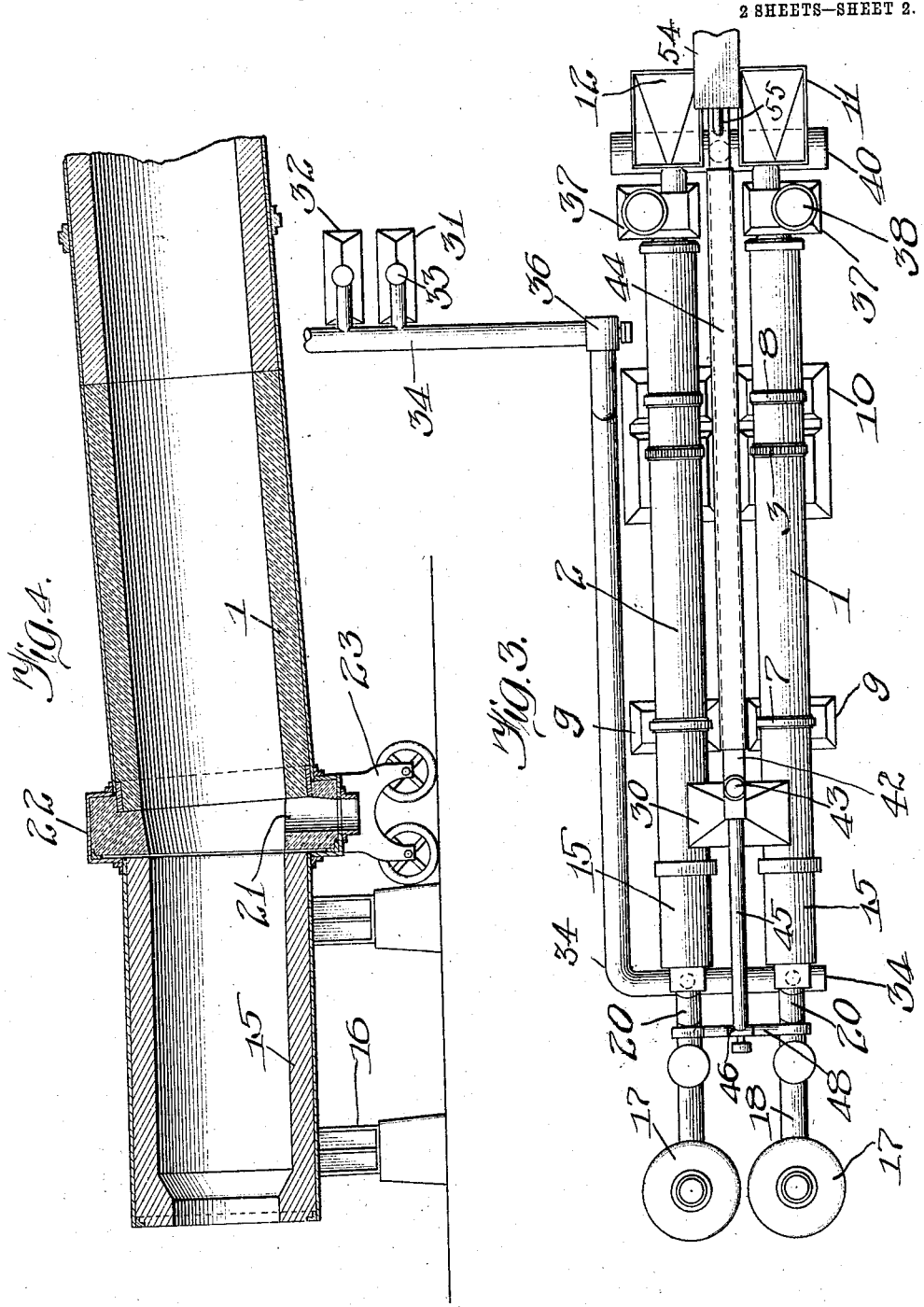

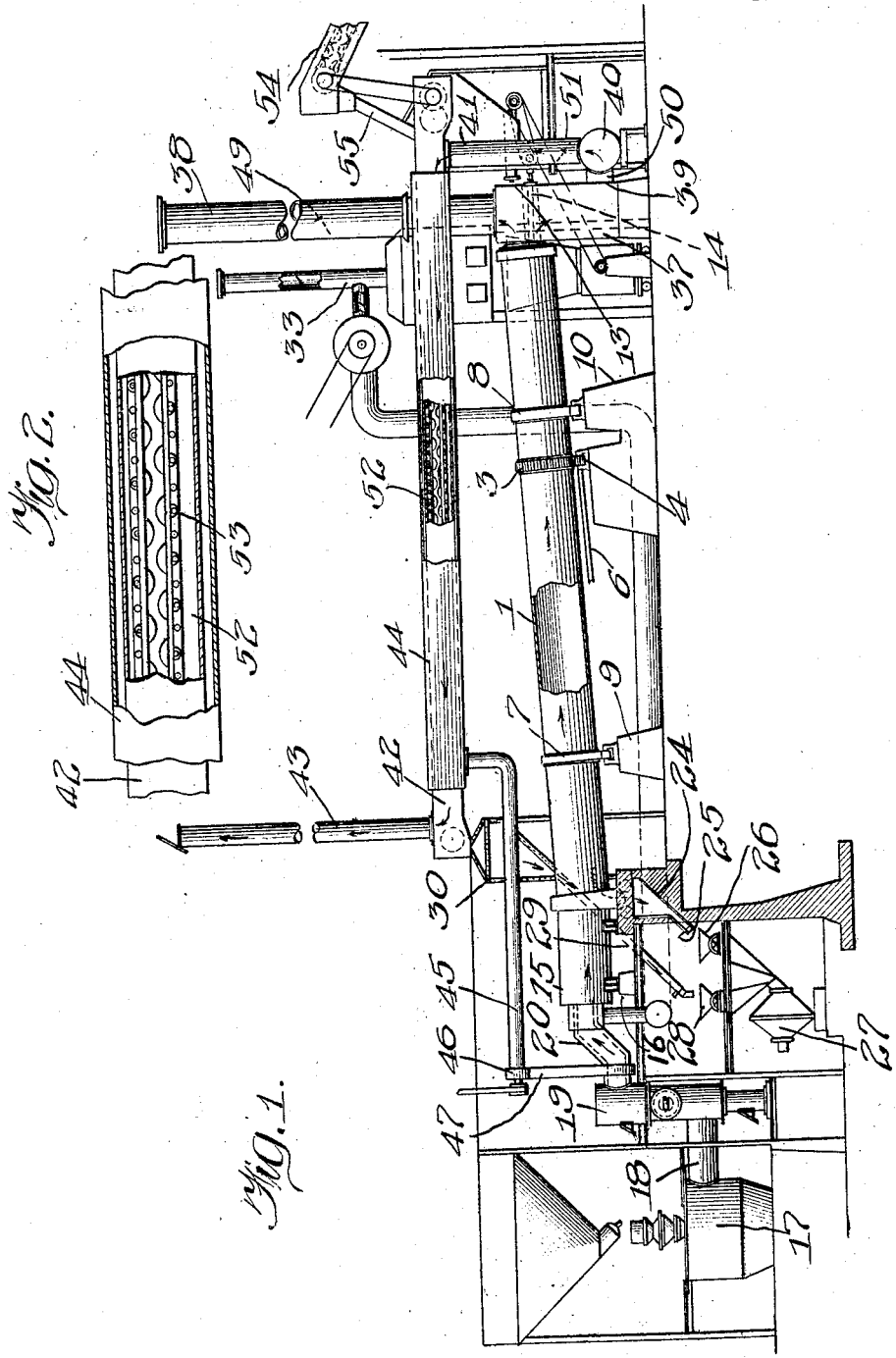

UNITED STATES PATENT OFFICE.

HERMAN L. HARTENSTEIN, OF CONSTANTINE, MICHIGAN.

APPARATUS FOR MANUFACTURING CARBID.

No. 888,610.    Specification of Letters Patent.    Patented May 26, 1908.

Application filed November 30, 1906.   Serial No. 345,751.

*To all whom it may concern:*

Be it known that I, HERMAN L. HARTENSTEIN, a citizen of the United States, residing at Constantine, in the county of St. Joseph and State of Michigan, have invented certain new and useful Improvements in Apparatus for Manufacturing Carbid, of which the following is a full, clear, and exact specification.

This invention relates to means for the proper treatment of calcium carbonate and carbon, or carbonaceous materials, for the production of calcium carbid.

The improvements are directed more particularly to economizing the heat necessary for the conversion of the elements and the production of the superior grade of carbid.

The primary object of the invention is to provide improved and efficient means for producing calcium carbid of a superior quality with the minimum expenditure of heat.

Another object of the invention is to provide improved means in the manufacture of carbid whereby the lime resulting from calcining the calcium carbonate will be discharged from the calcining furnace at substantially the hottest point thereof, whereby the greatest number of heat units may be saved from those employed in such calcination and utilized in the subsequent treatment of the calcium carbid producing elements.

Another object of the invention is to provide improved means whereby the gas evolved in the electric furnace ordinarily employed in apparatus of this character for fusing the ingredients, may be utilized for heating or burning the limestone or calcium carbonate.

With a view to the attainment of these ends, and the accomplishment of certain other objects, which will hereinafter appear, the invention consists in the features of novelty which will now be described with reference to the accompanying drawings, and more particularly pointed out in the claims.

In the said drawings,—Figure 1 is a diagrammatic illustration of a plant or apparatus embodying this invention, the same being in side view or elevation. Fig. 2 is an enlarged detail side elevation, partly broken away and in section, of a conveyer and heating jacket, hereinafter described. Fig. 3 is a plan view of the devices shown in Fig. 1, certain parts, hereinafter described, omitted for the sake of clearness. And Fig. 4 is an enlarged detail longitudinal sectional view of a portion of the calcining furnace or kiln hereinafter described.

The limestone or calcium carbonate employed in the manufacture of calcium carbid is introduced into one or more rotary kilns 1, 2. In this exemplification of the invention two of these kilns are shown as arranged in parallel relation for convenience of feeding and operation, but it will of course be understood that the number is entirely immaterial. Each of these is in the form of an elongated cylindrical chamber or tube, arranged in a slightly inclined position so as to encourage the downward feeding or travel of the limestone as it rests upon the bottom thereof. They may be given the desired rotary motion by any suitable or well known means, such as an encircling gear 3 and a pinion 4 driven by shaft 6 from any suitable source of power, the cylinder being supported by bearing bands 7, 8, on suitable pillows 9, 10. The material to be calcined, and which is preferably previously pulverized or ground, is introduced into bins or hoppers 11, 12, arranged at the upper ends of the kilns 1, 2. These bins are respectively provided with any suitable means for feeding the material into the kilns, the means shown being a screw-conveyer 13, which conveys the material from the bin and discharges it into another screw-conveyer 14, serving to conduct it directly into the mouth of the kiln, but the particular means employed for this purpose is not material, and any other arrangement might be used.

As the material works downwardly in the kiln it is subjected to a hot blast supplied to the kiln at the lower end thereof. In this example of the invention this blast is created by burning gas in a hearth or combustion chamber 15, which is situated at the lower end of the kiln, and is preferably cylindrical like the kiln, but instead of being rotatable is stationary and fixed upon any suitable supports 16 in such a relation to the end of the kiln that the products of combustion generated in the furnace will discharge directly into the kiln. This combustion chamber is supplied with gas from any suitable source, such as a gas-producer 17, one of which may be employed for each of the furnaces or combustion chambers 15, and connected thereto by the usual connections 18, 19, 20, employed in gas-producers of this character. The calcining material or lime produced by the action of the heat on the calcium carbonate in the rotary kiln eventually finds its way to a discharge aperture 21 located at the lower end of the kiln and at the inner end of the combustion chamber 15. This discharge aperture is preferably formed in a separate housing 22, which is fixed against rotation, like the combustion chamber 15, and into which the end of the kiln 1 is rotatably fitted so as to produce as close a joint as possible, the interior of the housing 22 being so formed that the bottom thereof will be substantially level, or slightly inclined downwardly from the bottom of the combustion chamber, so as to avoid any tendency of the material to pass beyond the discharge aperture 21 and enter the combustion chamber 15. For the sake of convenience in handling or manipulation when it is desired to make repairs, inspection, etc., the housing 22 may be mounted on a truck 23, whereby it may be rolled out of the way, when one of the other parts contiguous thereto is removed.

The length of the combustion chamber 15 is so proportioned with respect to the strength of the draft passing therethrough, and to the volume of fuel being consumed, that the point of most perfect combustion will take place substantially at the point where the discharge aperture 21 is situated, it of course being understood that the point of perfect combustion is considerably inward beyond the point where the combustible elements are introduced into the combustion chamber, and as a consequence the calcined material or lime will be discharged from the calcining furnace or kiln at the hottest point thereof. From the discharge aperture 21 the lime or calcined product falls into a hopper 24 situated thereunder, preferably one for each of the furnaces, and from this it is discharged at will past a controlling gate or valve 25 into a weighing machine 26, to determine the amount being introduced into the mixer 27, usually employed in this art for mixing the lime with the carbonaceous material, which latter is also weighed by a weighing machine 28, arranged to discharge into the mixer 27, and to receive its supply of coke or carbonaceous material through a valve spout 29 from a hopper 30. From the mixer 27 the commingled ingredients are conducted to the fusing furnaces, where they are subjected to a fusing degree of heat. These furnaces are usually electrical, and in this instance are illustrated as such at 31, 32, any suitable number of these being employed in the same plant. By the treatment of lime and carbonaceous material in these furnaces, a combustible gas, i. e., carbon monoxid, is evolved, and it is one of the purposes of this invention to utilize this gas in heating the calcining kilns 1, 2. In this exemplification of the invention the said result is accomplished by connecting the uptakes 33 of the electric furnaces with a main or manifold pipe 34, which may be provided with an exhauster 36 for drawing the gases out of the furnaces 31, 32, and forcing them into the pipes 20 leading from the gas-producers 17, so that this gas from the electric furnaces will be discharged along with the gas from the producers 17 into the combustion chambers 15, a suitable quantity of air, of course, being admitted at the same time to support combustion. It is of course desirable that the temperature of this combustion-supporting-air be raised as high as possible prior to the time of ignition, and in order that this may be done economically the waste heat and gases generated in the rotary kilns 1, 2, are utilized for that purpose.

By reference to Fig. 1 of the drawing it will be seen that the upper ends of the rotary kilns 1, 2, open into a breeching or chamber 37, which is provided with a stack or up-take 38, whereby the heat and gases from the kilns 1, 2, may be discharged into the atmosphere if desired, and this chamber or breeching 37 is also provided with an outlet 39, communicating with a manifold drum 40, which serves to connect the two chambers 37, one of these being provided for each of the kilns 1, 2, to a pipe or flue 41, connected at its upper end to a horizontal chamber 42 having a stack or up-take 43 at its end remote from the flue 41. This horizontal chamber 42 is incased in an air-jacket 44, open at its right-hand end as viewed in Fig. 2 and provided at its left-hand end with a discharge flue 45 having an exhauster 46, serving to draw the air through the jacket 44 and force it into the flues 20 through branch pipes 47, 48. The up-take 38 is provided with a damper or valve 49, which is closed when it is desired to force the waste heat from the kilns 1, 2, through the chamber 42, and the flues or pipes 39, 41, are provided with dampers 50, 51, respectively, which may be closed when it is desired to shut off the waste heat from one or more of the kilns 1, 2, and compel it to rise through the up-take 38. By this means it will be seen that fresh air may be drawn into the combustion chambers 15, heated to a high degree by the waste heat and gases from these kilns, without becoming contaminated and its combustibility destroyed by the carbonic acid gas evolved in the kilns 1, 2.

In order that the coke or carbonaceous material supplied to the hopper 30 may not, when being mixed with the highly heated lime discharging from the hopper 24, materially extract the heat from the latter, or be in a moist or damp state at the time of admixture therewith, it is preferable to heat it also to as high degree as possible consistent with economy of heat, before the two are mixed. This preheating of the coke or carbonaceous material is also accomplished by the waste heat and gases discharging from the kilns 1, 2.

As shown in Fig. 1, the horizontal chamber 42 is provided with a horizontal endless conveyer 52, which may be of any suitable construction, provided with pockets 53, or other means for carrying the material, and so constructed and arranged as to receive the material at one end and automatically discharge it at the other end into the hopper or bin 30. The conveyer is thus supplied with material from any suitable source by a conveyer 54 having a discharge-spout 55 emptying into the pockets of the conveyer 52, which are situated directly within the chamber 42 containing the hot gases and fumes from the kilns 1, 2, which thus serve to simultaneously heat the contents of the conveyer 52 and the air-jacket 44 without any of such non-combustible gases being allowed to enter the air in-takes of the combustion chambers.

The calcined material being discharged from the calcining furnace at the point where most perfect combustion occurs, it will be seen that it enters its receiving hopper 24 while containing the greatest possible number of heat units employed in its conversion into lime, and as a consequence none of this heat is lost, as would be the case if the calcined material were compelled to travel onward through the combustion chamber 15 before discharging. The material having been discharged into the hopper or bin 24, is weighed and mixed with the carbonaceous material, which is also heated to a high degree as before described, and the two thus commingled are conducted into the electric furnaces with all possible despatch and while in a highly heated condition, so that the lime will not be given an opportunity to deteriorate under the atmospheric influences or of absorbing carbonic acid gas or moisture, nor will the degree of temperature gained in its conversion into lime be lost and a correspondingly greater degree of temperature in the electric furnaces required to fuse the mixture.

In order that the invention may be understood by those skilled in the art, the details of this embodiment thereof have been thus specifically described, but

What I claim as new therein and desire to secure by Letters Patent is:

1. In an apparatus for the purpose described, the combination of a calcining furnace, means for supplying said furnace with a fuel element, an air heating chamber disconnected from said furnace and arranged to be heated by the waste gases therefrom, and means connecting said air heating chamber with the air in-take of said furnace for supporting combustion therein.

2. In an apparatus for the purpose described, the combination of a calcining furnace having a gas and air inlet, an air heating chamber disconnected from said calcining furnace and arranged to be heated by the waste gases therefrom, connected with said air inlet, an electric furnace adapted to evolve combustible gases, and means for conducting said combustible gases to the gas inlet of the calcining furnace.

3. In an apparatus for the purpose described, the combination of a calcining furnace, a chamber arranged to receive the waste gases from said calcining furnace, an air heating jacket surrounding said chamber and connected with the in-take of the calcining furnace for supporting combustion therein, and means for supplying the calcining furnace with combustible fluid.

4. In an apparatus for the purpose described, the combination of a calcining furnace having air and gas in-takes, a chamber connected with the calcining furnace for receiving the waste gases therefrom, a conveyer in said chamber whereby the material contained in the conveyer will be heated by said waste gases, an air heating jacket arranged in operative proximity to said chamber, and means connecting said air heating jacket with the air intake of the furnace.

5. In an apparatus for the purpose described, the combination of a calcining furnace for producing lime, means for mixing said lime with a carbonaceous material adapted to receive the lime from said furnace, and a holder or bin for said carbonaceous material, a conveyer for conducting the carbonaceous material to said bin, and a heating chamber inclosing said conveyer and communicating with the calcining furnace for receiving the waste gases therefrom.

6. In an apparatus for the purpose described, the combination of a calcining furnace having an air inlet for supporting combustion therein, a conveyer for conveying material to be mixed with the material calcined in said furnace, a chamber inclosing said conveyer and communicating with the calcining furnace for receiving the waste gases therefrom, and an air jacket arranged in operative proximity to said conveyer chamber and communicating with the air intake of the furnace.

7. In an apparatus for the manufacture of calcium carbid, the combination of a calcining furnace having a combustion chamber at one end, and a discharge aperture for the calcined material located at a point remote from the intake end of the combustion chamber and at the point of highest temperature in the furnace.

8. In an apparatus for the manufacture of calcium carbid, the combination of a calcining furnace embodying a combustion chamber having an air inlet for supporting combustion and a gas inlet for supplying the combustion chamber with fuel, an electric furnace closed against the admission of atmospheric air, and being independent of such calcining furnace and having a gas outlet connected with said gas inlet.

In testimony whereof I have signed my name to this specification, in the presence of two subscribing witnesses, on this 23rd day of November A. D. 1906.

HERMAN L. HARTENSTEIN.

Witnesses:
FRANCIS A. HOPKINS,
CHAS. H. SEEM.